United States Patent
Kyker et al.

[11] Patent Number: 6,026,477
[45] Date of Patent: Feb. 15, 2000

[54] BRANCH RECOVERY MECHANISM TO REDUCE PROCESSOR FRONT END STALL TIME BY PROVIDING PATH INFORMATION FOR BOTH CORRECT AND INCORRECT INSTRUCTIONS MIXED IN THE INSTRUCTION POOL

[75] Inventors: Alan B. Kyker, Portland; Darrell D. Boggs, Aloha, both of Oreg.

[73] Assignee: Intel Corporation, Santa Clara, Calif.

[21] Appl. No.: 09/002,000

[22] Filed: Dec. 31, 1997

[51] Int. Cl.[7] ....................................... G06F 9/38
[52] U.S. Cl. ............... 712/2; 712/233; 712/234; 712/235; 712/236; 712/237
[58] Field of Search ...................... 712/200; 395/580–587

[56] References Cited

U.S. PATENT DOCUMENTS

| | | | |
|---|---|---|---|
| 4,974,154 | 11/1990 | Matsuo | 712/240 |
| 5,542,109 | 7/1996 | Blomgren et al. | 712/234 |
| 5,586,278 | 12/1996 | Papworth | 712/235 |
| 5,729,728 | 3/1998 | Colwell | 712/234 |
| 5,812,839 | 9/1998 | Hoyt | 712/239 |

OTHER PUBLICATIONS

Shanley, Tom "Pentium Pro Processor System Architecture," pp. 61–118, 1997.

*Primary Examiner*—Meng-Ai T. An
*Assistant Examiner*—Stacy Whitmore
*Attorney, Agent, or Firm*—Antonelli, Terry, Stout & Kraus, LLP

[57] ABSTRACT

An improved branch recovery mechanism includes an instruction fetch unit, an instruction decode stage, a branch prediction unit coupled to the decode stage for predicting whether the branch instruction will be taken, and an instruction pool for receiving and storing micro-ops. After a mispredicted branch is detected, micro-ops corresponding to a correct path are loaded into the instruction pool without waiting for the mispredicted branch instruction to be retired. By immediately loading the correct path into the instruction pool, Front End stall time can be reduced. Micro-ops in the instruction pool are distinguished based on path information for each micro-op stored in the instruction pool. The micro-ops corresponding to the mispredicted path are deleted as quickly as possible without committing their execution results to architectural state.

17 Claims, 5 Drawing Sheets

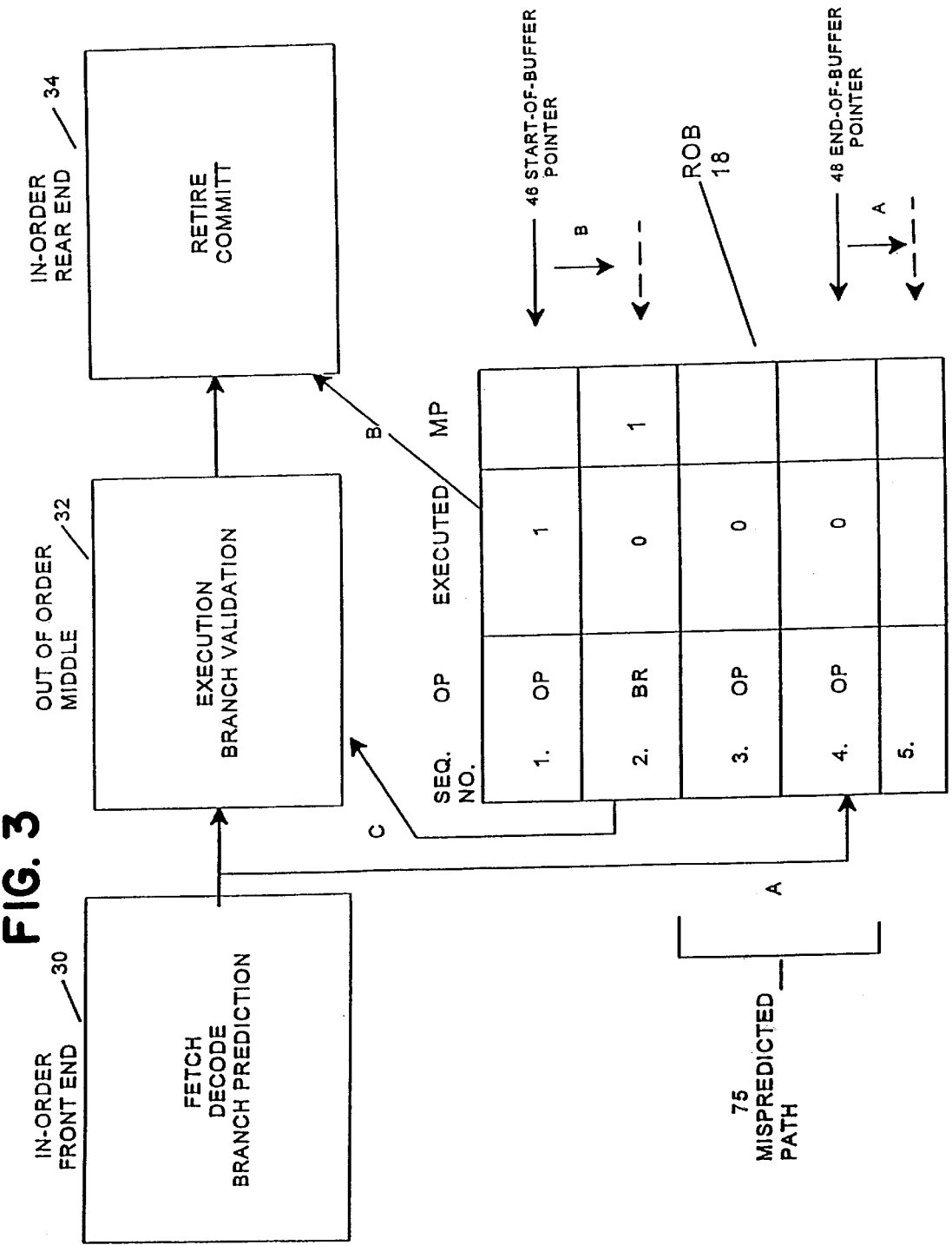

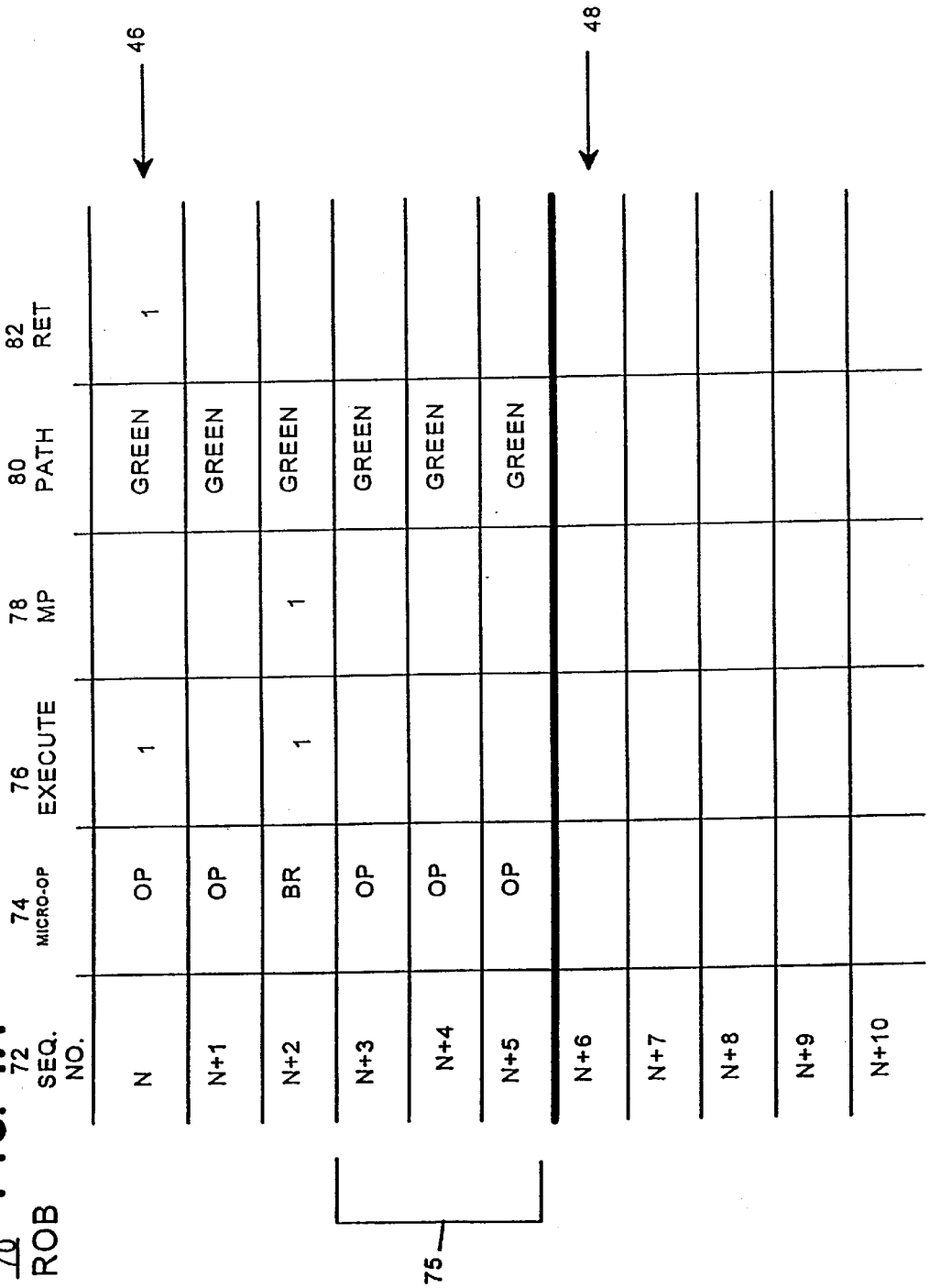

FIG. 4B

70 ROB

| 72 SEQ. NO. | 74 MICRO-OP. | 76 EXECUTE | 78 MP | 80 PATH | 82 RET |
|---|---|---|---|---|---|
| N | OP | 1 | | GREEN | 1 |
| N+1 | OP | 1 | | GREEN | 1 |
| N+2 | BR | 1 | | GREEN | 1 |
| N+3 | OP | | | GREEN | |
| N+4 | OP | | 1 | GREEN | |
| N+5 | OP | | | GREEN | |
| N+6 | OP | | | BLUE | |
| N+7 | OP | | | BLUE | |
| N+8 | OP | | | BLUE | |
| N+9 | OP | | | BLUE | |
| N+10 | | | | | |

↓46 (above N+3 column area)
↓48 (above N+10 column area)

75 MISPREDICTED PATH (GREEN) — spans N+3 through N+5

85 CORRECT PATH (BLUE) — spans N+6 through N+9

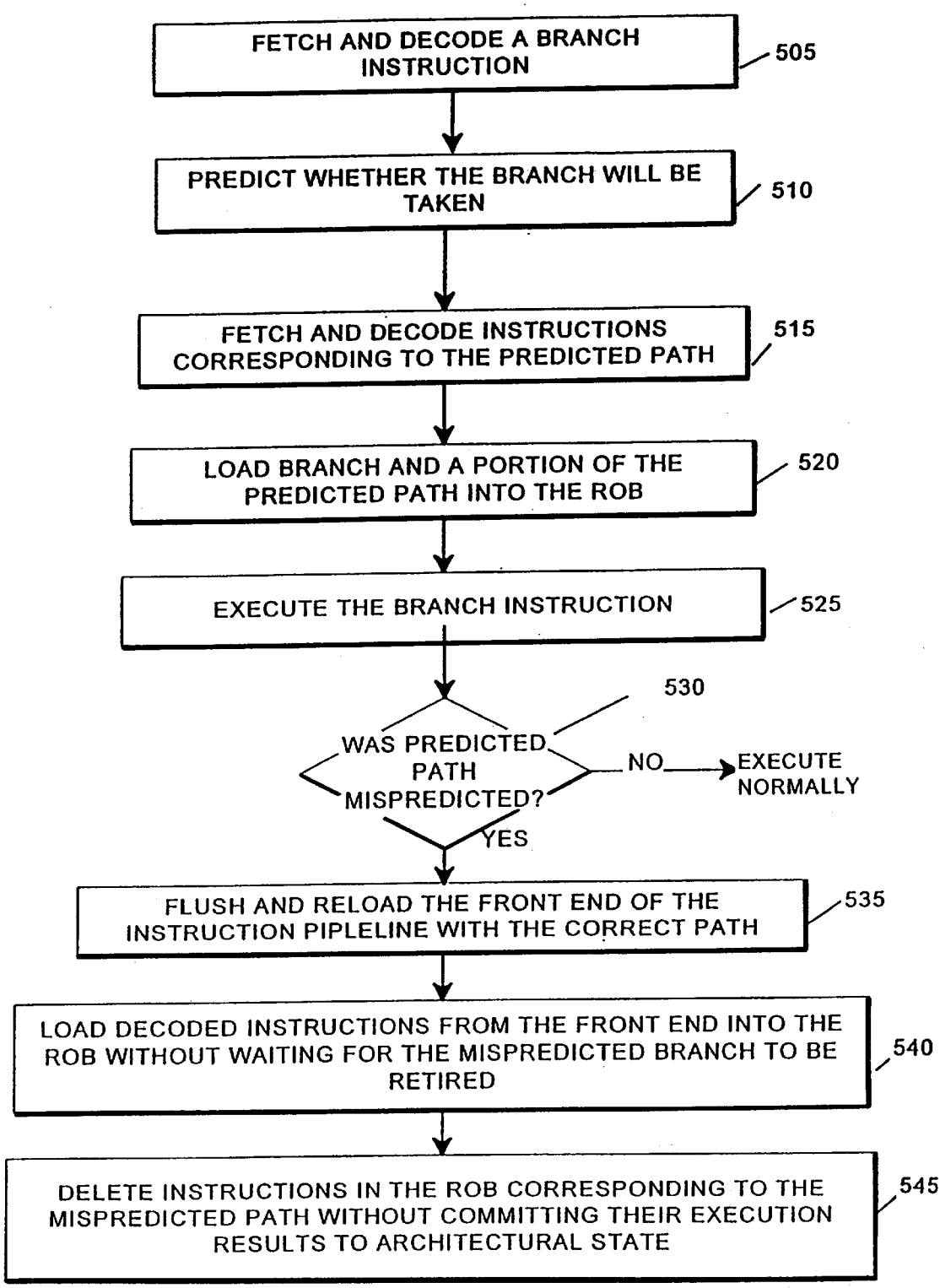

BRANCH RECOVERY MECHANISM TO REDUCE PROCESSOR FRONT END STALL TIME BY PROVIDING PATH INFORMATION FOR BOTH CORRECT AND INCORRECT INSTRUCTIONS MIXED IN THE INSTRUCTION POOL

TECHNICAL FIELD

The present invention relates to instruction pipelines in a processor, and more particularly, to an improved mechanism for recovering from a mispredicted branch.

BACKGROUND OF THE INVENTION

In an effort to speed processor execution, prefetcher's were incorporated in the Intel x86 processor family (e.g., 8086, 80186, 80286, 80386, 80486). The prefetcher works on the assumption that the execution unit will want the next instruction from the next sequential memory location. While the execution unit is executing an instruction, the prefetcher takes advantage of idle bus time to fetch the next sequential instruction from memory and place this instruction in the processor's prefetch queue. This technique works fine for non-branch instructions. However, whenever a jump or branch instruction is encountered, the entire prefetch queue must be flushed and reloaded with the correct instructions, thereby slowing the processor.

The Pentium and Pentium Pro processor from Intel Corp. added branch prediction logic to permit the prefetcher to make more intelligent decisions regarding what information to prefetch from memory. The instruction pipeline 10 of the Pentium Pro processor is illustrated in FIG. 1 and includes eleven stages, including Instruction Fetch Units 12 (IFU1, IFU2, IFU3), Decode stages 14 (DEC1, DEC 2), the Register Alias Table and Allocator stage 16 (RAT), the ReOrder Buffer 18 (ROB) (also known as the instruction pool), the Dispatch stage 20 (DIS), the Execution stage (EX) 22, and the Retirement stages 24 (RET1, RET2).

The first seven stages of the instruction pipeline 10 (fetch 12, decode 14, RAT 14 and ROB 16 stages) are known as the In-Order Front End section 30 of the processor because the instructions are kept in strict program order. The Dispatch stage 20 and the Execution stage 22 are known as the Middle Out-of-Order section 32 of the processor because micro-ops can be executed in any order. The Retirement stages 24 are also known as the In-Order Rear End section 34 of the processor because micro-ops are retired in program order.

FIG. 2 illustrates the operation of the instruction pipeline of the Pentium Pro processor. The instructions are fetched by the Instruction Fetch Units 12 (FIG. 1) and placed into a prefetch streaming buffer 40. The instructions are decoded into micro-ops by the Decode stages 14 and stored in the instruction decode queue (ID Queue) 42. The micro-ops are then moved into the ROB (or instruction pool) 18 in strict program order to await execution.

The ROB 18 is a circular buffer with 40 entries and includes a start-of-buffer pointer and an end-of-buffer pointer. The start of buffer pointer points to the oldest (unretired) micro-op in the ROB 18. The end-of-buffer pointer points to where the next micro-op will be stored in the ROB 18. Initially the ROB 18 is empty and the start-of-buffer pointer and the end-of-buffer pointer point to the first ROB entry (entry 0). As instructions are decoded into micro-ops (up to three per clock), the micro-ops are placed in the ROB 18 starting at entry 0 in strict program order and the end-of-buffer pointer is incremented once for each micro-op.

If any instructions are branches, the fetched memory addresses are provided to a Branch Target Buffer (BTB) for branch prediction. Whenever a branch instruction enters the instruction pipeline, the prediction logic predicts whether the branch will be taken (by examining the execution history of the instruction). The branch prediction is used to load instructions into the In-Order Front End section 30 corresponding to the predicted path.

Once the micro-ops are placed in the ROB (or instruction pool) 18 in strict program order, they are executed one or more at a time, as data and execution units for each micro-op become available. In the Dispatch stage 20 (FIG. 1), each micro-op is copied from the ROB 18 to a Reservation Station if all the data required by the micro-op is available. The micro-op is then dispatched by Dispatch stage 20 to an execution unit when one becomes available. The micro-ops can be executed out of order. Once executed, the results of the micro-ops' execution are stored in the ROB 18 at the ROB entry occupied by the micro-op. As each micro-op in the ROB completes execution, it is marked as ready for retirement.

The retirement stages 24 constantly check the status of the three oldest micro-ops in the ROB 18 to determine when all three of them have been executed and marked as ready for retirement. The micro-ops are then retired (by RET2) in original program order. As each is retired, the micro-op's execution result is committed to architectural state by copying the micro-op's execution result from the ROB entry into the processor's real register set. The respective ROB entry is then deleted or flushed and the start-of-buffer pointer is incremented to point to the oldest unretired micro-op in the ROB 18.

FIG. 3 illustrates the operation of the instruction pipeline 10 of FIG. 1. Instructions are fetched, decoded into micro-ops, and stored in the ROB 18 to await execution. Steps A–C illustrate some examples of the type of operations performed in the instruction pipeline 10. At step A, a micro-op is stored at sequence number 4 in the ROB 18 (ROB entry 4) and the End-of-Buffer pointer 48 is incremented from ROB entry 4 to ROB entry 5 (where the next decoded micro-op will be stored in the ROB 18).

After the micro-op of sequence number 1 (ROB entry 1) has completed execution, the execution result is stored in the ROB entry 1 and ROB entry 1 is marked as executed (a 1 is marked in the Executed bit for ROB entry 1). At step B, the micro-op of ROB entry 1 is retired by copying the micro-op's execution result from ROB entry 1 into the processor's real register set. The micro-op and other information in ROB entry 1 is then deleted and the start-of-buffer pointer 46 is incremented to point to ROB entry 2, which is the oldest (unretired) micro-op in ROB 18. ROB entry 1 is now available to receive a new micro-op.

At step C, the branch micro-op at sequence number 2 is executed and validated. In this example, during validation, it is determined that the branch of sequence number 2 has been incorrectly predicted, and therefore, the instructions that were prefetched and stored in the ROB after the branch entry 2 (micro-ops for ROB entries 3 and 4) are incorrect (were mispredicted). The micro-ops for ROB entries 3 and 4 correspond to the mispredicted path 75. In addition, the instructions in the pipeline stages earlier than the ROB 18 (e.g., the Instruction Fetch Units 12, the prefetch streaming buffer 40, the Decode stages 14, the RAT 16, the ID Queue 42) also correspond to the incorrect path and must be flushed. After flushing the micro-ops in the pipeline stages earlier than the ROB, the instructions corresponding to the correct path are then fetched and decoded. However, the ROB 18 cannot be flushed and the new micro-ops corresponding to the correct path cannot be loaded from the Front End section 30 into the ROB 18 until all instructions prior to and including the mispredicted branch (at ROB entry 2) have been executed and retired. When the mispredicted branch has been retired, then the ROB 18 is flushed or cleared and the micro-ops corresponding to the correct path can be loaded into the ROB 18.

In the example of FIG. 3, there are no unexecuted instructions before the mispredicted branch. Generally, however, because the branch operation may have been executed out of order (before one or more older instructions), the Front End section 30 can stall (wait) at the out of order boundary and cannot load the new (correct path) micro-ops from the Front End section 30 (e.g., Decode stages 14) into the ROB 18 until the mispredicted branch instruction has been retired and the ROB 18 flushed. (The out of order boundary refers to where the in order Front End section 30 meets the out of order Middle section 32). In other words, the Pentium does not mix correct and incorrect micro-ops in the ROB 18.

To determine when the correct path can be loaded into ROB 18, the Retirement stages 24 check the status of the three oldest micro-ops in the ROB 18. When the Retirement stages 24 find that the oldest executed micro-op in the ROB 18 is the mispredicted branch, this indicates that all previous (older) micro-ops have been executed and retired. The mispredicted branch can then be committed to architectural state and retired. The ROB 18 is then completely flushed or cleared and the stall is released. The micro-ops of the correct path are then loaded from the Decode stages 14 into the ROB 18 beginning at the first ROB entry.

In the Pentium processor, the time required to flush and fully reload the Front End section 30 with the correct path was typically greater than the time required for the mispredicted branch to be retired. Therefore, in the Pentium processor, the Front End section 30 of the processor rarely stalled or waited for the mispredicted branch to be retired before reloading the ROB 18 with micro-ops of the correct path.

However, improved techniques have increased the speed of the Instruction Fetch Units 12 and Decode stages 14, thereby, greatly increasing the Front End section 30 stall time after a mispredicted branch. As a result, a need exists for a more efficient technique to recover from a mispredicted branch in order to reduce the Front End stall time.

SUMMARY OF THE INVENTION

According to the branch recovery mechanism of the present invention, the problem of Front End stall time can be reduced. According to an embodiment of the branch recovery mechanism of the present invention, a branch instruction is decoded and it is predicted whether the branch will be taken. The branch instruction and one or more instructions corresponding to a predicted path are loaded from a Front End section of an instruction pipeline to an instruction pool. Next, it is determined whether the branch instruction is mispredicted. If the branch instruction is mispredicted, then the following steps are performed: The Front End section is flushed and reloaded with instructions corresponding to a correct path. And, instructions corresponding to the correct path are loaded from the Front End section into the instruction pool before the mispredicted branch instruction is retired.

BRIEF DESCRIPTION OF THE DRAWINGS

FIG. 3 is another block diagram illustrating the operation of the instruction pipeline of FIG. 1.

FIG. 4A is a block diagram of a ReOrder Buffer (ROB) of an instruction pipeline for illustrating the branch recovery mechanism according to an embodiment of the present invention.

FIG. 4B is a block diagram of the ReOrder Buffer of FIG. 4A after detection of a mispredicted branch for illustrating the branch recovery mechanism according to an embodiment of the present invention.

FIG. 5 is a flow chart illustrating the operation of the branch recovery mechanism according to an embodiment of the present invention.

DETAILED DESCRIPTION

Figure 1:
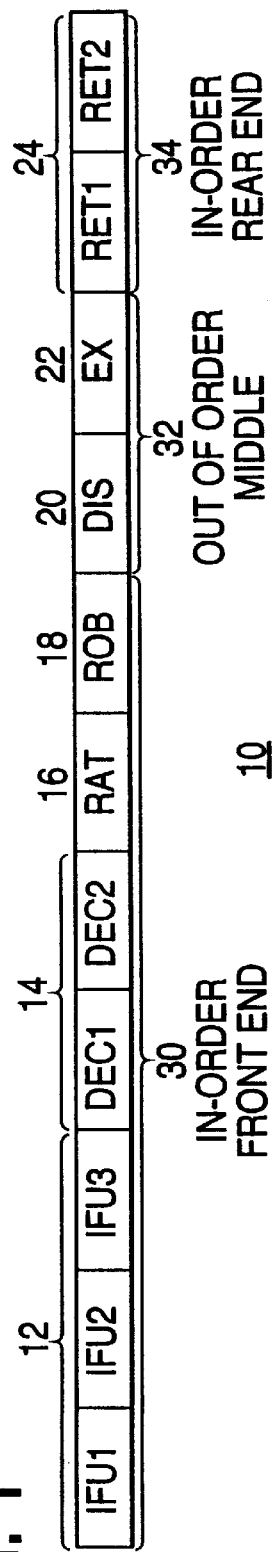
FIG. 1 is a block diagram illustrating an instruction pipeline for a processor.

Referring to the drawings in detail, wherein like numerals indicate like elements, FIG. 4A is a block diagram of a ReOrder Buffer (ROB) (or instruction pool) 70 of an instruction pipeline for illustrating the branch recovery mechanism according to an embodiment of the present invention. FIG. 4B is a block diagram of the ReOrder Buffer 70 of FIG. 4A after detection of a mispredicted branch for illustrating the branch recovery mechanism according to an embodiment of the present invention.

Figure 2:
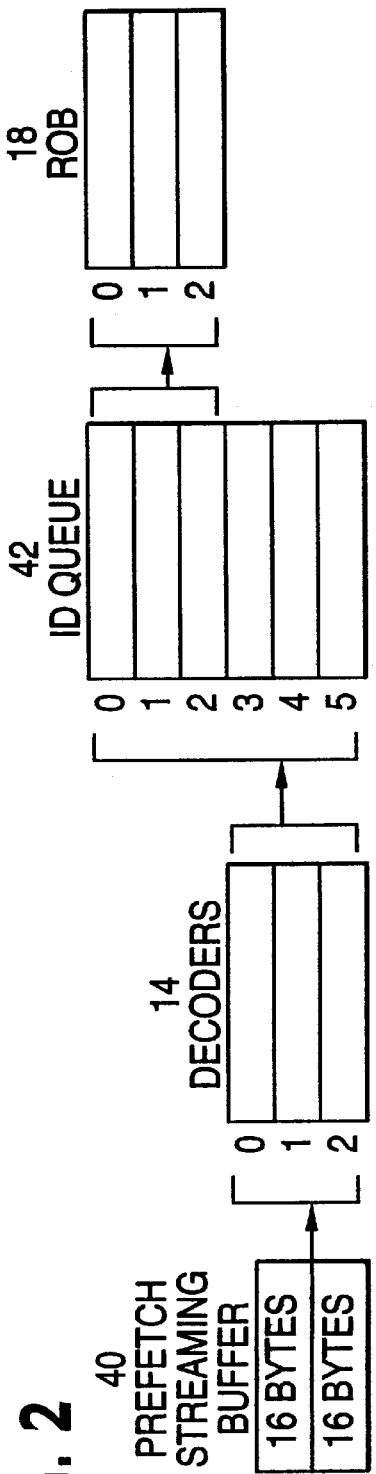
FIG. 2 is a block diagram illustrating the operation of the instruction pipeline of FIG. 1.

The instruction pipeline 10 according to an embodiment of the present invention is similar to the instruction pipeline 10 of FIGS. 1–3, except that ROB 70 in FIGS. 4A and 4B of the present invention replaces ROB 18 in the instruction pipeline 10 of FIG. 1. In addition, the instruction pipeline 10 of the present invention operates differently from the instruction pipeline of FIGS. 1–3, as described in greater detail below.

Referring to FIG. 4A, each entry in ROB 70 includes a ROB sequence (or entry) number 72, the micro-op 74, an execute bit 76 indicating whether the micro-op has been executed, a mispredict (MP) bit 78 indicating whether a branch was mispredicted, path information 80 identifying the path of the micro-op, and a Retired bit 82 (RET) indicating whether the micro-op has been marked ready for retirement. Although not shown in FIG. 4A, each ROB entry can include space for storing the execution results for each micro-op. Alternatively, execution results can be stored in a register, and a pointer in the ROB can point to the register storing the execution results for an instruction.

Six micro-ops are stored in ROB 70 of FIG. 4A, including micro-ops for ROB entries N through N+5. Micro-ops N, N+1 and N+3 through N+5 are non-branch micro-ops. Micro-op number N+2 is a branch instruction. A 1 in the Execute bit 76 and a 1 in the Retired bit 82 of ROB entry N indicate that the micro-op of ROB entry N has been executed and marked ready for retirement, respectively. No other micro-ops in ROB 70 have been executed.

The start-of-buffer pointer 46 in FIG. 4A currently points to micro-op N, which is the oldest (unretired) micro-op in ROB 70. The end-of-buffer pointer 48 in FIG. 4A points to ROB entry N+6, which is where the next micro-op from Decode stages 14 will be stored in the ROB 70.

The path information 80 identifies the micro-ops that correspond to a particular path. A new "path" is created after each mispredicted branch. According to the present invention, the path information 80 is used to more efficiently recover from a mispredicted branch in order to reduce the Front End stall time. The path information 80 allows the processor to distinguish between micro-ops corresponding to the mispredicted (or incorrect) path and micro-ops that correspond to the correct path.

The path information 80 can include different types of identification information. In the embodiment illustrated in FIG. 4A, the micro-ops for ROB entries N through N+5 correspond to a green path. Other colors (such as blue or red) can be used to identify different paths. Rather than colors, other types of information can be used to identify different paths, such as PathA, PathB, PathC, or Path1, Path2 and Path3, etc. The path information 80 can be implemented as one or more bits for uniquely identifying the path for each micro-op in ROB 70.

When the branch instruction (of ROB entry 2 in FIG. 4A) enters the instruction pipeline 10 of the present invention, the Branch Prediction Unit (in the Front End section 30) predicts whether the branch will be taken (by examining the execution history of the instruction). The branch prediction is used to load micro-ops into the Front End section 30 corresponding to the predicted path. In the embodiment of the present invention illustrated in FIG. 4A, the micro-ops of ROB entries N through N+2 are part of an actual path because there is no prediction involved. As a result, these micro-ops of ROB entries N through N+2 will always be executed and have their execution results committed to architectural state (retired). The micro-ops for ROB entries N+3 through N+5 (after the branch instruction) correspond to the path predicted by the Branch Prediction Unit (the "predicted path"). The micro-ops for ROB entries N+3 through N+5 may or may not be executed and have their execution results committed to architectural state depending on whether the branch was correctly predicted or mispredicted.

The branch micro-op of ROB entry N+2 and the three predicted micro-ops at ROB entries N+3 through N+5 are loaded into the ROB 70 in strict program order. Eventually, the branch micro-op at ROB entry N+2 is executed and validated. During validation, it is determined that this branch micro-op was incorrectly predicted. At the time it is determined that the branch instruction was mispredicted, the last micro-op to be loaded into the ROB is the micro-op at ROB entry N+5. The end-of-buffer pointer 48 points to ROB entry N+6, which is where the next micro-op from Decode stages 14 will be stored in ROB 70.

FIG. 4B is a block diagram of the ReOrder Buffer of FIG. 4A after the detection of the mispredicted branch. The instructions for ROB entries N+3 through N+5 are part of the mispredicted path 75. The instructions in the Front End section 30 also correspond to a portion of the mispredicted path. The mispredicted path 75 is also identified by the path information 80 as part of the green path.

After the mispredicted branch is detected by the execution stage 22, the Front End section 30 is flushed and reloaded with instructions corresponding to the correct path. After the Front End section 30 is flushed and reloaded with the correct path, the correct path micro-ops are then loaded from the Front End section 30 into the ROB 70 beginning at the ROB entry N+6 (where the end-of buffer pointer 48 points at the time the mispredicted branch is detected).

In FIG. 4B, four micro-ops corresponding to the correct path 85 have been loaded in program order from the Front End section 30 into the ROB 70 at ROB entries N+6 through N+9. After loading the micro-ops corresponding to the correct path 85, the end of buffer pointer 48 is updated to point to ROB entry N+10. The start of buffer pointer 46 also has been updated to point to ROB entry N+3 because the mispredicted branch micro-op has been retired. Micro-ops N+3, N+4 and N+5 are known to be erroneous (the mispredicted path 75) because these micro-ops have the same path information 80 as the mispredicted branch (the Green path) and have a sequence number that is greater than the mispredicted branch instruction (sequence number 2).

FIG. 5 is a flow chart illustrating the operation of the branch recovery mechanism according to the embodiment of the present invention illustrated in FIGS. 4A and 4B.

At step 505 the Instruction Fetch Units 12 fetch a branch instruction which is input to Decode stages 14. Decode stages 14 then decode the branch instruction.

At step 510, the Branch Prediction unit, which is part of the Front End section 30, predicts whether or not the branch instruction will be taken.

At step 515 the branch prediction made by the Branch Prediction unit is used to fetch and decode instructions corresponding to the predicted path. The Instruction Fetch Unit 12 fetches instructions corresponding to the predicted path and stores these instructions in the prefetch streaming buffer 40. Decode stages 14 then decode the instructions into one or more micro-ops which are placed in ID Queue 42.

At step 520, the branch micro-op and at least a portion of the predicted path are loaded from the Front End section 30 into ROB 70 (or instruction pool) beginning at entry number N+2. The branch micro-op is stored at ROB entry N+2, as indicated in FIG. 4A. Referring to FIG. 4A, the micro-ops corresponding to the predicted path 75 are stored in the ROB 70 at ROB entries N+3 through N+5. The path information 80 for each of these micro-ops identifies each of these micro-ops as part of the green path (the same path information as the branch instruction at N+2).

At step 525, the Execution stage 22 executes the branch instruction at ROB entry N+2. Instructions in the ROB 70 are stored in strict program order, however, instructions may be executed out of program order. Therefore, at the time the branch micro-op is executed, only the micro-op of entry No. N has been executed and marked ready for retirement. Therefore, the branch micro-op of ROB entry N+2 is executed before the micro-op of ROB entry N+1.

At step 530, the Execution stage 22 of the Front End section 30 determines whether or not the predicted path (predicted at step 510) was correct based on the branch micro-op of ROB entry N+2. If the path was correctly predicted, the processor continues operating normally to fetch, decode, execute and retire instructions without flushing and reloading the Front End section 30 and the ROB 70. If, however, the predicted path was mispredicted, then the steps of 535, 540, and 545 will be performed.

At step 535, the Front End section 30 is flushed and reloaded with the instructions corresponding to the correct path. This is performed, for example, by the Instruction Fetch Units 12 fetching instructions from the correct path. The fetched instructions corresponding to the correct path are placed in the prefetch streaming buffer 40 which are then output to Decode stages 14. Decode stages 14 then decode each of the instructions corresponding to the correct path into one or more micro-ops.

At step 540, micro-ops corresponding to the correct path are loaded from the Front End section 30 to the ROB 70 without waiting for the mispredicted branch to be retired (i.e., correct micro-ops are loaded into ROB 70 before the mispredicted branch is retired). As illustrated in FIG. 4B, there are four instructions corresponding to the correct path 85 that are loaded into ROB 70 extending from entry no. N+6 through entry no. N+9. The path information 80 for each micro-op stored in the ROB 70 corresponding to the correct path 85 is identified as part of the blue path. The path information 80 and the sequence number 72 allow the processor to distinguish between the mispredicted path 75 (part of the green path) at ROB entries N+3 through N+5, and the correct path 85 (the blue path) at ROB entries N+6 through N+9.

According to an embodiment of the present invention, the Front End section 30 is flushed and reloaded with the correct path (step 535). However, unlike prior art instruction pipelines, the Front End Section 30 of the present invention does not stall or wait for the mispredicted branch instruction to be retired before loading the ROB 70 with the correct path. According to the present invention, the ROB 70 is immediately loaded with micro-ops from the Front End Section 30 corresponding to the correct path before the mispredicted branch (of sequence number N+2) is retired. As a result, the Front End stall time is reduced.

At step 545, the micro-ops in the ROB 70 corresponding the mispredicted path 75 are deleted from ROB 70 without committing their execution results to architectural state. These instructions corresponding to the mispredicted path 75 after the branch instruction include the micro-ops at entries N+3 through N+5 and should be deleted from ROB 70 without committing their execution results to architectural state because they are incorrect (were mispredicted). The micro-ops at sequence numbers N+3, N+4 and N+5 are known to be part of the mispredicted path 75 because these micro-ops have the same path information 80 (the green path) as the mispredicted branch instruction and have a sequence number that is greater than the mispredicted branch instruction (a sequence number greater than N+2).

According to an embodiment of the present invention, after some micro-ops corresponding to the correct path have been loaded into the ROB 70, the ROB 70 includes correct micro-ops up to and including the mispredicted branch (e.g., micro-ops for ROB entries N through N+2, FIG. 4B), incorrect micro-ops corresponding to the mispredicted path 75 (e.g., ROB entries N+3 through N+5), and one or more micro-ops of the correct path 85 (e.g., Blue path micro-ops including ROB entries N+6 though N+9). Therefore, unlike prior systems, the present invention mixes correct micro-ops and incorrect micro-ops in the ROB 70 after detecting a mispredicted branch to avoid stalling or waiting for the mispredicted branch to be retired. Because the ROB 70 will at least temporarily include both correct and incorrect micro-ops, the processor of the present invention determines whether or not each micro-op in the ROB 70 should be executed and/or committed to architectural state based on path information 80 and sequence number 72 for each micro-op.

The micro-ops (having the same path information 80 as the mispredicted branch) up to and including the mispredicted branch instruction (ROB entries N through N+2 of the green path) are correct, and therefore, are executed and committed to architectural state. Similarly, the micro-ops in the ROB 70 after the mispredicted branch that are identified by path information 80 as being part of a different path from the branch instruction (e.g., the correct or blue path 85 including the micro-ops at ROB entries N+6 through N+9 of ) are also correct and are therefore executed and committed to architectural state. Execution can occur out of order. There are several ways in which the execution results can be committed to the architectural state. For example, the micro-ops execution results can be committed to the architectural state by copying the execution result from the corresponding ROB entry into the processor's real register set. This can be done directly by copying the execution result, or can be done indirectly by the use of pointers.

However, the micro-ops having path information that is the same as the mispredicted branch (e.g., green path) and having a sequence number greater than (e.g., after) the mispredicted branch (e.g., ROB entries N+3 through N+5) are part of the mispredicted path 75 and should be deleted from ROB 70 without committing their execution results to architectural state. Unnecessary execution of these micro-ops corresponding to the mispredicted path 75 wastes system resources needed for execution of the correct micro-ops. Therefore, to improve the speed of recovery from the mispredicted branch, the micro-ops corresponding to the mispredicted path 75 should be deleted from ROB 70 as soon as possible after detecting the mispredicted branch to minimize use of system resources.

According to one embodiment of the present invention, an incorrect micro-op (corresponding to the mispredicted path 75) can be (and should be) deleted from ROB 70 after detection of the mispredicted branch if execution of the incorrect micro-op has not begun. In the event that execution of an erroneous or incorrect instruction cannot be prevented (e.g., where execution has already begun), there are several techniques that can be used to reduce use of system resources for these erroneous instructions.

First, memory operations typically access cache for data operands. However, if the data is not in the cache, this will cause a cache miss where data must be retrieved from main memory. However, when a memory operation is part of a mispredicted path (an erroneous instruction), the data retrieval step should be canceled after a cache miss to save main memory and bus bandwidth.

In addition, the resources of the system scheduler should not be tied up. For example, if an erroneous micro-op (corresponding to mispredicted path 75) depends on data from other micro-ops, the micro-op should be allowed to execute without waiting for the dependent data. The micro-op should be allowed to execute as if the data from the other micro-op was already available to thereby speed the execution and of the micro-op. Other techniques may be used to speed the execution of the micro-ops corresponding to the mispredicted path 75. After the micro-ops corresponding to the mispredicted path 75 have been executed (if necessary), the micro-op's execution results are not committed to architectural state (because these micro-ops are incorrect or erroneous). Rather, these incorrect micro-ops are deleted from ROB 70.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of recovering from a mispredicted branch instruction comprising the steps of:

decoding a branch instruction;

predicting whether the branch will be taken;

loading the branch instruction and one or more instructions corresponding to a predicted path from a front end of an instruction pipeline to an instruction pool;

determining whether the branch instruction was mispredicted, and performing the following steps if the branch was mispredicted:

flushing and reloading the front end with instructions corresponding to a correct path;

loading instructions corresponding to the correct path from the front end into the instruction pool without waiting for the mispredicted branch instruction in the instruction pool to be retired; and storing information in the instruction pool that distinguishes instructions in the instruction pool corresponding to the predicted path from the instructions corresponding to the correct path.

2. The method of claim 1 and further comprising performing the following step if the branch was mispredicted:

deleting the instructions from the instruction pool corresponding to the predicted path without committing their execution results to architectural state.

3. The method of claim 2 wherein said step of deleting comprises the step of immediately deleting the instructions in the instruction pool corresponding to the predicted path without executing the predicted path instructions or committing their execution results to architectural state.

4. The method of claim 1 and further comprising performing the following step if the branch was mispredicted:

flushing the instructions in the instruction pool corresponding to the predicted path after the branch without executing or committing the predicted path instructions.

5. The method of claim 1 wherein said step of storing information comprises the steps of:

storing path information in the instruction pool identifying each predicted path instruction stored in the instruction pool as corresponding to the predicted path;

storing path information in the instruction pool identifying each correct path instruction stored in the instruction pool as corresponding to the correct path.

6. A method of recovering from a mispredicted branch instruction comprising the steps of:

predicting whether a branch instruction will be taken;

loading the branch instruction and instructions corresponding to a predicted path from a front end section of an instruction pipeline to an instruction pool;

storing path information in the instruction pool identifying each predicted path instruction as corresponding to the predicted path;

determining whether the branch instruction was mispredicted, and performing the following steps if the branch was mispredicted:

flushing and reloading the front end section with instructions corresponding to a correct path;

loading instructions corresponding to the correct path from the front end section into the instruction pool without waiting for the mispredicted branch instruction in the instruction pool to be retired;

storing path information in the instruction pool identifying each correct path instruction as corresponding to the correct path;

selectively committing execution results to architectural state for some of the instructions stored in the instruction pool based upon the instruction's path information for each instruction.

7. The method of claim 6 wherein said step of selectively committing comprises the steps of:

deleting the instructions in the instruction pool after the mispredicted branch instruction corresponding to the predicted path without committing their execution results to architectural state;

executing the instructions in the instruction pool corresponding to the correct path and committing their execution results to architectural state.

8. The method of claim 7 wherein said step of deleting the instructions in the instruction pool after the mispredicted branch instruction comprises the step of deleting without executing those predicted path instructions in the instruction pool after the mispredicted branch instruction.

9. A method of recovering from incorrect prediction in an instruction pipeline having an in-order front end including an instruction pool, an out of order execution stage, and a retirement stage, said method comprising the steps of:

predicting the flow of execution;

loading the predicted flow into the instruction pool;

assigning a sequence ID to each instruction to each instruction of the predicted flow in the instruction pool;

detecting if the predicted flow was correctly predicted, and performing the following steps if the predicted flow was not correctly predicted;

identifying a correct flow;

flushing a portion of the in-order front end of the instruction pipeline;

reloading the portion of the in-order front end of the instruction pipeline with instructions of the correct flow;

loading one or more instructions of the correct flow into the instruction pool without waiting for any instructions corresponding to the predicted flow to be deleted or retired from the instruction pool; and assigning a path information for each instruction in the instruction pool to distinguish the predicted flow from the correct flow.

10. The method of claim 9 wherein the path information changes every time the predicted flow was incorrectly predicted.

11. The method of claim 9 and further comprising the step of:

deleting and not committing to architectural state instructions that have a path information that is the same as an incorrectly predicted branch instruction and having a sequence ID that is greater than an incorrectly predicted instruction.

12. The method of claim 11 and further comprising the step of reducing the use of system resources for operations that have a path information that is the same as the incorrectly predicted instruction and having a sequence ID that is greater than the incorrectly predicted instruction.

13. An apparatus for recovering from a mispredicted branch instruction comprising:

an instruction decode stage decoding a branch instruction;

a branch prediction unit coupled to the decode stage and predicting whether the branch instruction will be taken;

an instruction decode queue coupled to the decode stage and storing the decoded instructions;

an instruction pool coupled to the instruction decode queue and receiving and storing decoded instructions, the instruction pool adapted to store at the same time both instructions corresponding to a predicted path and instructions corresponding to a correct path, the instruction pool also storing information that distinguishes the instructions of the correct path from instructions of the predicted path;

an execution/validation stage executing instructions and determining whether a branch was correctly predicted; and a retirement/commit stage coupled to the execution/validation stage and the instruction pool, the retirement/commit stage committing instructions corresponding to the correct path and not committing instructions corresponding to the predicted path after the branch instruction if the execution validation stage determines that the branch instruction was not correctly predicted.

14. An apparatus for recovering from a mispredicted branch instruction comprising:

means for decoding a branch instruction;

means for making a prediction as to whether the branch instruction will be taken;

means for executing instructions and for determining whether the branch instruction was correctly predicted;

means for storing at the same time both instructions corresponding to a predicted path and instructions corresponding to a correct path if the branch instruction was not correctly predicted and for storing information that distinguishes the instructions of the correct path from instructions of the incorrectly predicted path;

means for committing instructions corresponding to the correct path; and means for deleting without committing instructions corresponding to the predicted path after the branch instruction if the branch instruction was not correctly predicted.

15. The apparatus of claim 14 and further comprising:

means for flushing and reloading the decoding means with instructions corresponding to the correct path after it is determined that the branch instruction was incorrectly predicted; and means for loading decoded instructions corresponding to the correct path from the decoding means into the means for storing without waiting for an incorrectly predicted branch instruction to be retired.

16. A method of allowing a recovery from a mispredicted branch instruction comprising the steps of:

predicting a path of instructions after a branch instruction;

loading one or more instructions of the predicted path into an instruction pool;

determining that the branch instruction was mispredicted, which indicates that instructions of the predicted path after the branch instruction are incorrect;

determining a correct path of instructions after the branch instruction;

clearing the incorrect instructions of the predicted path from the instruction pool;

loading one or more instructions of the correct path into the instruction pool before all the incorrect instructions of the predicted path have been cleared from the instruction pool, causing both correct and incorrect instructions to be mixed in the instruction pool at the same time;

storing information in the instruction pool that allows the incorrect instructions of the predicted path in the instruction pool to be identified.

17. The method of claim 16 wherein said step of storing information comprises the steps of:

storing path information in the instruction pool that distinguishes instructions of the predicted path from instructions of the correct path;

storing sequence numbers or other information for each instruction in the instruction pool that allows the incorrect instructions of the predicted path in the instruction pool to be identified.

* * * * *